United States Patent Office 2,985,825
Patented May 23, 1961

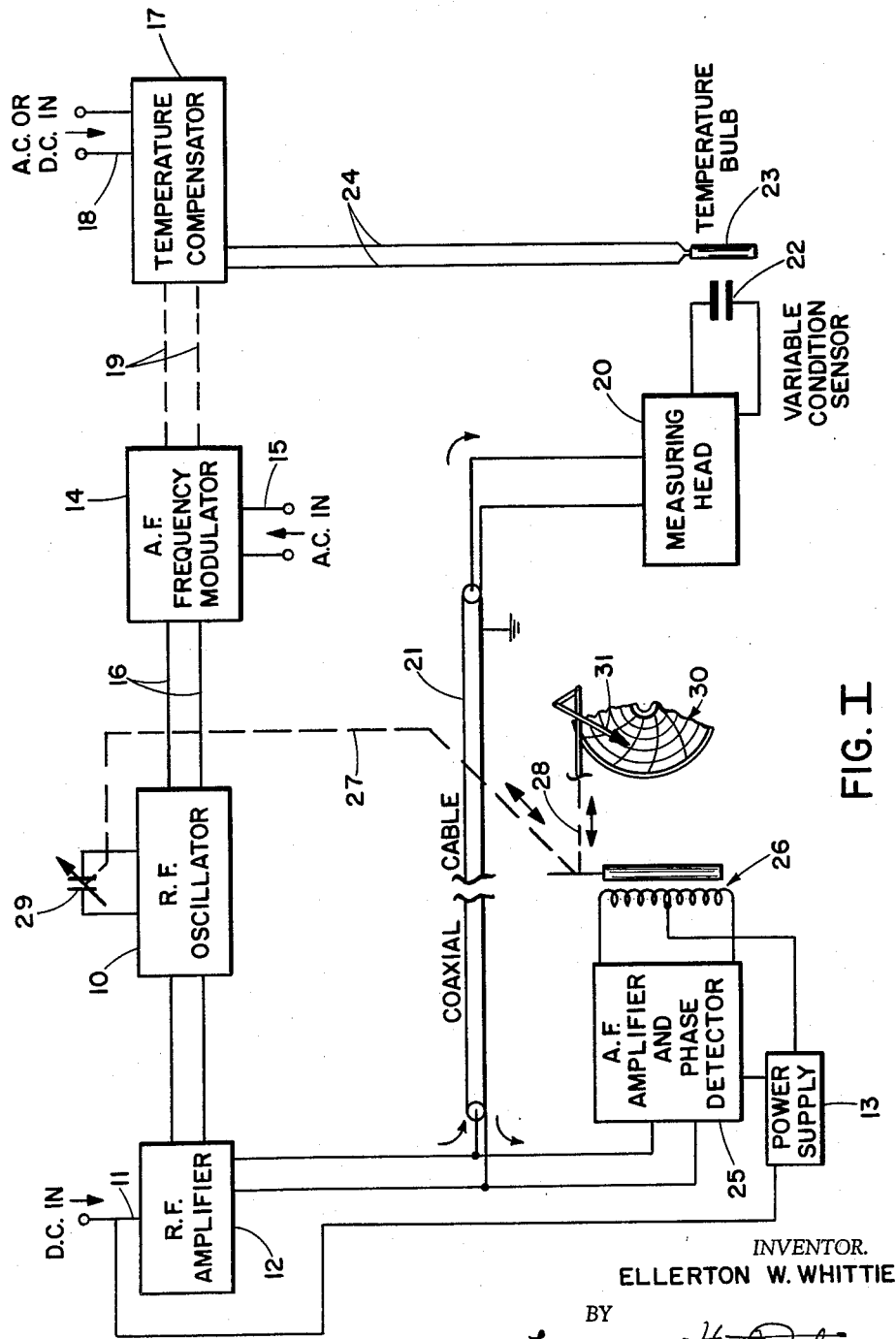
FIG. I

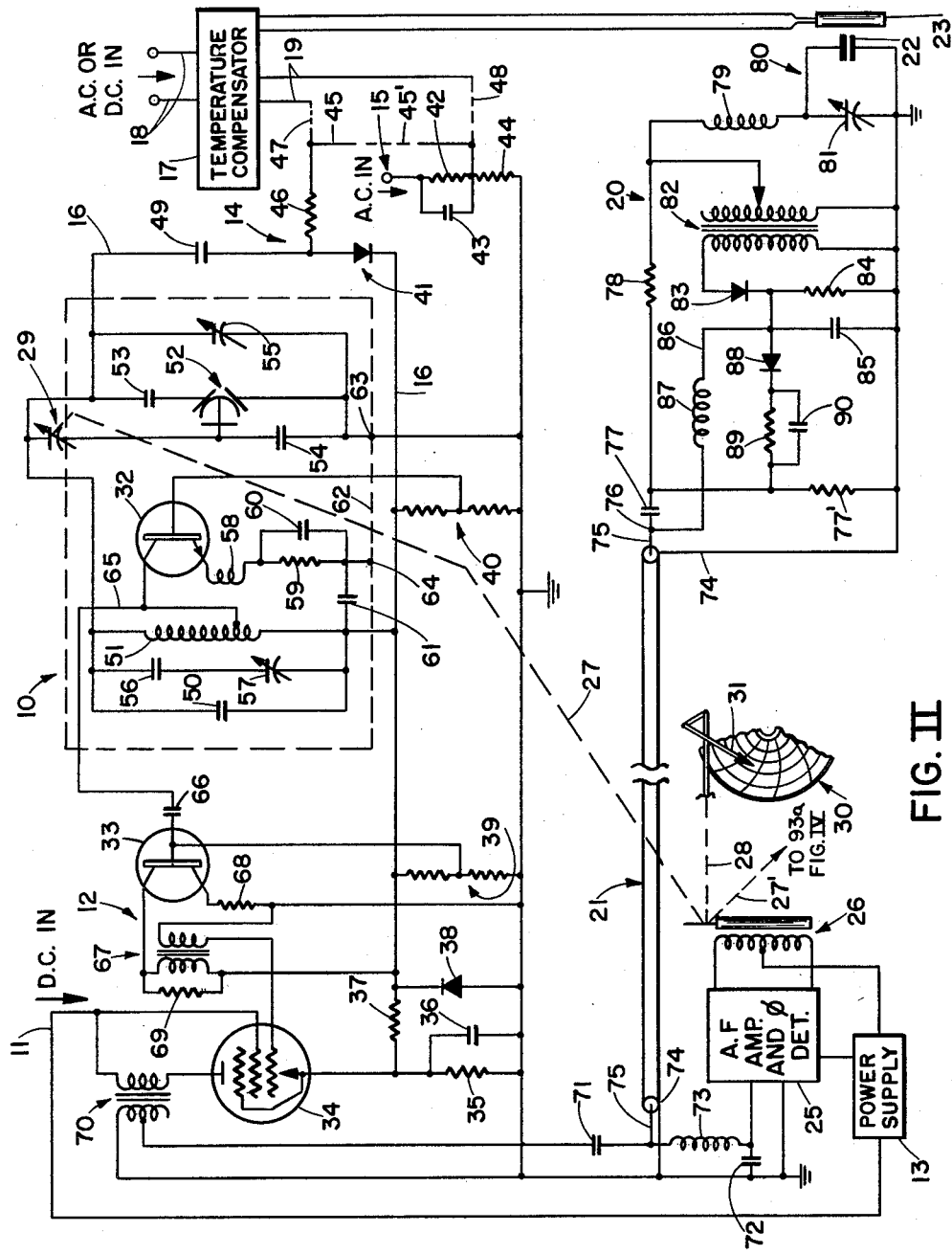
FIG. II
INVENTOR.
ELLERTON W. WHITTIER
BY
Lawrence H. Patton
AGENT

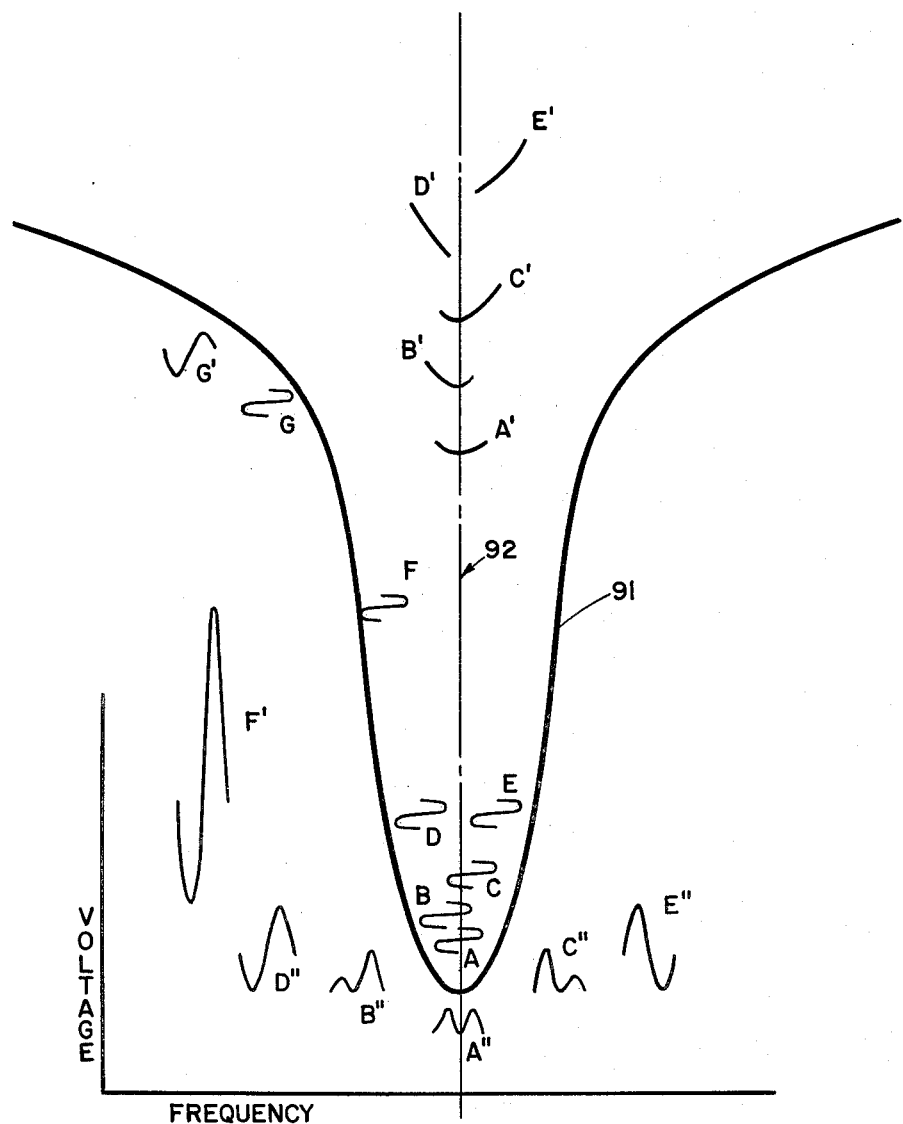
FIG. III

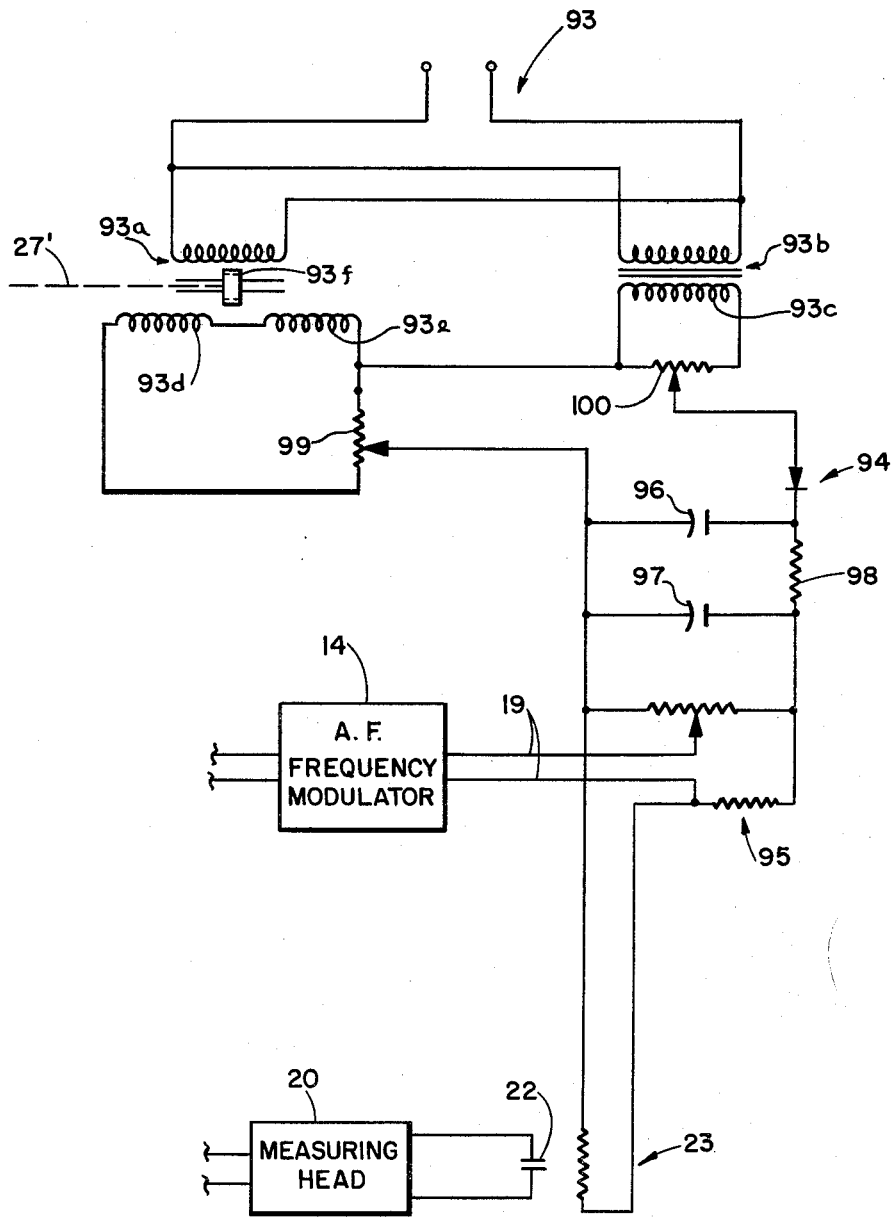
FIG. IV

2,985,825
RESONANCE RELATION ELECTRICAL SERVOSYSTEM

Ellerton W. Whittier, Needham, Mass., assignor to The Foxboro Company, Foxboro, Mass., a corporation of Massachusetts Filed Jan. 15, 1959, Ser. No. 787,322

1 Claim. (Cl. 324—61)

This invention relates to variable condition measurements by means of electrical circuitry operated on a servosystem frequency relation basis.

The system according to this invention is particularly useful as an electrical capacity measurement device for the measurement of product dielectric properties, for example in the chemical, refining, and oil distribution industries. It may also be used as a precision device for determining changes in such variables as liquid level, moisture, and displacement.

This invention provides the combination of a measuring head electrical resonance circuit as a variable condition change sensing device, and an electrical oscillator for energizing the measuring head.

The oscillator is made to follow the measuring head. A measuring head frequency change causes an oscillator frequency change. Thus a resonance relation balance is maintained between the natural resonance frequency of the measuring head and the energization of the measuring head.

In a system according to this invention, the oscillator is established in a predetermined frequency relation with respect to the natural resonance frequency of the measuring head. As an example, this relation may be a precise centering of an audio frequency modulation sweep on a high frequency oscillator with respect to the natural resonance frequency of the measuring head.

Continuing with this example, a change in the variable condition produces a different natural resonance frequency in the measuring head by changing a capacity-inductance value relation in the head. When this happens, the oscillator frequency sweep is no longer centered at the natural resonance frequency of the head. This decentering action provides the basis of an error signal and a representation thereof is applied to the oscillator to adjust the range of the frequency modulation sweep to center the sweep at the new natural resonance frequency of the head.

When this relation is thus reestablished, the error signal dispappears. The correction factor involved is available as a working output proportional representation of the variable condition change. Such an output can be applied, for example, to a recording pen.

While a system according to this invention is readily useful with the measuring head and oscillator close together, it lends itself particularly well to applications with the measuring head and oscillator widely separated and connected by cable, readily in distances up to a mile, and further as desired, with suitable increase in operating power. An advantage afforded by this invention is the elimination of critical cable lengths, or types.

A further feature of this invention is the ability to perform well, in the case of capacity measurement, with polar type dielectric fluids as the material being measured. Such fluids are said to have "sticky molecules," or to be "lossy dielectric fluids," i.e. such as those offering resistance of molecular rotation with each alternation of alternating current potential. In prior art capacity measurement situations such polar fluids have not been satisfactorily measurable because of changes in the resistance factor of the measurement caused by this polar condition.

In the starting condition of the illustrative system wherein the oscillator frequency modulation is centered at the resonance peak of the measurement head, the oscillator frequency is continuously shifted uniformly back and forth past the resonance peak of the measuring head. This action produces a balanced signal in the measurement head, and no error signal appears.

When a variable condition value change occurs, the resonance peak of the measurement head shifts with respect to the center of the oscillator modulation frequency sweep. The result is an error signal which is identifiable as to its presence, and as to its phase. The frequency of this error signal is the same as the oscillator modulating audio frequency, or is some frequency directly and continuously related thereto. Adjustment of the frequency sweep range of the oscillator is accomplished with this error signal, and the error signal disappears when, by this action, the oscillator modulation frequency sweep is again centered at the resonance peak of the measuring head. This resonance peak is at a new frequency due to the change in the resonance condition of the measuring head as occasioned by the variable condition value change.

This invention provides a system wherein there is no danger of electric shock or spark from any part of the measureing head circuit or its cable. It is thus an excellent device for hazardous locations.

No artificial line assemblies are needed in the device of this invention.

A highly stable oscillator is provided, as a part of the system of this invention, which is nevertheless frequency variable by modulation and adjustment.

It is an object of this invention to provide a new and improved resonance relation electrical servosystem.

Other objects and advantages of this invention will be in part apparent and in part pointed out hereinafter and in the accompanying drawings, wherein:

Figure I is a block diagram illustration of a system according to this invention;

Figure II is a detail illustration of the system of Figure I;

Figure III is a resonance curve illustration of the signal producing action in the measuring head circuit in the system of Figures I and II; and Figure IV is a circuit diagram of one form of temperature compensation device in combination in the system of this invention.

In Figure I the block diagram of an illustrative embodiment of this invention sets forth a radio-frequency oscillator 10 which is energized as best seen in Figure II by a direct current input 11. This input is applied through a radio frequency amplifier 12 and is taken from a power supply 13 shown at the bottom of the drawing.

At the top of Figure I, an audio-frequency modulator 14 with an alternating current power supply input indicated at 15, is shown as applied to the radio-frequency oscillator 10 through leads 16 as a means of continuously frequency modulating the oscillator 10. A direct current output temperature compensator unit 17 powered by alternating or direct current as desired and as indicated at 18 is associated with the audio-frequency modulator 14 as needed and as indicated by means of dotted line connections 19. Thus an oscillator unit is provided, comprising modulator 14, oscillator 10 and amplifier 12.

The output of the radio-frequency amplifier 12 is applied to a measuring head 20 by means of a coaxial cable 21. As will be shown in detail later herein, the measuring head 20 includes a resonance circuit, and the oscillator 10 is modulated to provide a frequency sweep centered at the natural frequency of the measuring head 20. With the modulation frequency sweep so centered there is no error signal. Associated with the measuring head 20 and as a part of the resonance circuit thereof a sensing element condenser 22 is provided as a device whose dielectric is varied as the variable condition which is being measured by this system. In the situations where a temperature compensation in the measuring area is desired, a temperature bulb 23 is provided, with leads 24 therefrom, as the sensing element for the temperature compensator device 17 as it is applied to the audio-frequency modulator 14.

Error signals developed in the measuring head 20 in response to dielectric changes in the measuring condenser 22 are transmitted back through the same coaxial cable 21 and thence to an audio-frequency amplifier and phase detector unit 25 which is powered from the supply 13. The output of this amplifier and detector unit is an electrical to mechanical translation device 26 which produces movement in representation of the variable condition change, and as indicated by dotted lines 27 and 28. The movement indicated by the line 27 is applied to a variable condenser 29 in the radio-frequency oscillator 10 and wherein the condenser 29 is a part of the resonance circuit of the oscillator 10. Such adjustment of the condenser 29 changes the resonance condition of the oscillator 10 and so adjusts the range of the modulation sweep frequency of the oscillator 10 to follow the measuring head 20 to maintain the centering of the oscillator frequency sweep at the natural frequency of the measuring head 20 when this natural frequency has been changed by a capacitance change in the sensing condenser 22. In furtherance of the mechanical movement from the translation device 26 the movement indicated by dotted line 28 is applied to a recording instrument device indicated at 30 for the movement of a pen 31 therein.

Figure II is a detail showing of the greater part of the circuitry indicated in Figure I with the various sections in the same relative positions in Figures I and II.

In the Figure II showing the upper portion of the drawing is mainly an oscillator unit comprising the oscillator 10, the audio-frequency modulator 14 therefor and the radio frequency amplifier 12 in the output of the oscillator 10. In this overall oscillator unit there is provided an oscillator transistor 32 as the driving unit in the oscillator 10 itself, and a second transistor 33, located in the output of the oscilator 10.

The transistor 33 is part of an amplifier circuit wherein current changes are translated into voltage changes and applied to a vacuum tube 34. The combination of the transistor 33, the vacuum tube 34 and the associated circuitry thus provides amplification of the output of the oscillator 10.

The activation for the oscillator 10 is in the form of direct current as indicated at 11 and derived from the power supply 13. This D.C. as applied to the vacuum tube 34 results in a voltage drop across a resistor 35 as a cathode bias on the vacuum tube 34, with respect to ground. Accordingly the radio frequency of the oscillator works above and below a potential established well above ground. A radio frequency bypass condenser 36 is provided in parallel with the bias resistor 35. A conventional voltage regulator arrangement is provided in the combination of a resistor 37 from the cathode of the vacuum tube 34, and a diode 38 in parallel with the bias resistor 35. This arrangement regulates the voltage to the transistor 33 and to bias controls indicated by resistor arrangements 39 and 40 as applied to the transistors 33 and 32 respectively, as well as to a silicon diode 41. The diode 41 is the modulator of the oscillator 10 on the basis of changing capacity when direct current or low frequency alternating current is applied thereto.

The oscillator 10 is preferably operated at radio frequency to provide lower circuit impedance and greater sensitivity. The modulation therefor as applied to the silicon diode 41 is preferably audio-frequency, for example, 60 cycle alternating current.

This modulation of the radio frequency by the audio-frequency may be arranged with the modulation centered at the peak of resonance of the measurement head 20. Thus a departure from this centering of this modulation in this manner produces an imbalance which creates a basis of an error signal. Accordingly it is not necessary to modulate the radio frequency to any great extent, but only to a degree sufficient to establish a reasonable error signal. The 60 cycle alternating current is supplied to the modulator diode 41 from the input 15 through a parallel arrangement of a resistor 42 and a phasing condenser 43 as related to ground through a bias resistor 44.

Thus modulating alternating current potential is applied to the modulator 41 through a connection 45 and a radio-frequency blocking resistor 46 which nevertheless allows an input of direct current potential or low frequency alternating current potential to the diode 41. Through dotted line connections 47 and 48 the temperature compensation factor from the device 17 may be applied to the modulating system on a direct current basis to cause it to shift one way or the other in temperature compensation. If the temperature compensator is used, the connection 45 is broken as at 45' and the modulating alternating current may be applied through the temperature compensation device 17 by means of suitable connections therein (not shown). In series with the modulator diode 41 is a condenser 49 which tends to linearize the output of the modulator diode 41.

In the oscillator itself the resonance circuit comprises basically the adjustable condenser 29 in combination with a tank condenser 50 and a tank coil 51. In association with this resonance arrangement is a differential span trimmer condenser 52 which operates with adjacent condensers 53 and 54 to provide a linear span adjustment effect. In parallel with this arrangement is an adjustable condenser 55 which is used as a zero point trimmer condenser for adjusting the setting of the pen 31 in the recording instrument 30 at the bottom of the drawing. The modulator diode 41 is also a part of the oscillator as a capacity unit.

As indicated hereinbefore the adjustment of the oscillator condenser 29 is utilized to change the resonance condition of the oscillator 10 so that the oscillator will follow the natural resonance frequency changes in the measurement head 20. However, through suitable similar arrangements (not shown), either electrical or mechanical, oscillator resonance condition change may be accomplished by changing the inductance of the coil 51.

The coil 51 is a part of the tank circuit of this oscillator. In a parallel arrangement with coil 51 is a series arrangement of a negative temperature compensating condenser 56, wherein as the temperature rises the capacity gets smaller, and an adjustable condenser 57 which establishes the magnitude of the corrective action of the temperature compensating condenser 56. This arrangement provides a stability factor for the oscillator and cleans up frequency drift as caused by temperature change.

A tickler coil 58 through which the transistor 32 is driven is operatively conventionally associated with the tank coil 51. In association with the tickler coil 58 is a bias resistor 59. A pair of condensers 60 and 61 are provided as radio-frequency bypasses to ground. The oscillator is surrounded by a shield 62 which is grounded as at 63 and to which the bias resistor 59 and the bypass condensers 60 and 61 are connected as at 64.

The tank coil 51 in the oscillator 10 is tapped down by the output lead 65 for impedance match and at the same time as a means of reducing frequency change caused by temperature effects on the transistor 32. The output lead is then applied to the transistor 33 through a coupling condenser 66, to the base of the transistor 33 as a drive therefor. A current to voltage translation device is utilized in the output of the transistor 33 as indicated by tranformer 67. Resistor 68 provides a base bias for the transistor 33.

Thus the output of the transformer 67 is a swinging voltage applied to the vacuum tube 34 in an amplification action. To assure that this action will be amplification and not oscillation, a resistor 69 is connected across the primary of the transformer 67.

The output of the vacuum tube 34 is applied to a step-down transformer 70 to supply a voltage to the transmission cable 21 sufficient to supply the cable losses and further to supply a sufficient signal to energize the measurement head 20.

In the output line from the oscillator unit a pair of direct current blocking condensers 71 and 72 are provided, as well as a radio-frequency choke 73 in association with the line to the audio-frequency amplifier and phase detector 25. At this point in the circuitry, that is, at the beginning of the cable 21, on the one hand the oscillator frequency is applied through the cable 21 to the measuring head 20, and on the other hand the error signal from the measuring head 20 travels through the cable in the reverse direction and is applied to the audio-frequency amplifier and phase detector unit 25. Thereafter through suitable conventional electrical to mechanical translation means as indicated at 26, a representation of the error signal is applied through mechanical connections 27 and 28 to the oscillator condenser 29 and to the recording instrument 30 respectively. A further mechanical connection 27' relates to Figure IV as discussed hereinafter.

The cable 21 is grounded through shield connection 74 and has a central core 75 through which signals pass in both directions.

Continuing with Figure II and with respect to the measuring head 20, an output signal connection to the operating cable 75 is indicated as at 76. Beyond this connection point 76, toward the measuring head 20, a low impedance blocking condenser 77 is provided to block low frequency alternating current, that is, the error signal, from escaping to ground through a line termination resistor 77', and to insure that the error signal will return through the cable 75.

As a means of providing a line termination resistance, a combination of resistance factors is arranged in the measuring head circuit 20. This termination resistance is non-inductive and is equal to the characteristic impedance of the cable, such that the cable is essentially free of standing waves and reflections and is non-critical as to length. The main resistance consideration is the resistor 77' connected from the measurement head side of the condenser 77 to ground. Incorporated in this line termination resistance is a series resistor 78 in the line 75 as well as the resistive component of the resonance circuit arrangement of inductance and capacity. This arrangement comprises a series arrangement of an inductance 79 and a capacity 80 wherein the capacity 80 is a parallel arrangement of two condensers 81 and 82. Item 22 is a measuring condenser and 81 is a padding condenser.

With this arrangement, therefore, one of the substantial advantages of this invention as used as a telemetering system is provided in that the line length, that is, the cable length between the oscillator and the measuring head, is immaterial and can be discounted insofar as undesirable standing waves and reflections are concerned. The length of cable is limited only by the power available to push the signals therethrough to make up for line losses. Field adjustments of cable length may readily be made without concern for these undesirable line factors other than the provision of a suitable resistance arrangement in the measuring head 20.

The series resistor 78 is a device for limiting the current drawn by the resonance combination of inductance 79 and capacity 80 when this arrangement is in resonance. The resonance arrangement is of low impedance so the resistance 78 must be used to provide a substantial voltage drop.

In the operation of this overall system, when a change occurs in the capacity of the measuring condenser 22 due to a dielectric change between the plates thereof, the resonance condition of the arrangement of the inductance 79 and the capacity 80 is changed so that the resonance peak is moved away from that frequency originally supplied by the oscillator 10 as the center of the frequency modulation sweep. This action causes an imbalance signal which when rectified as discussed hereinafter is productive of an error signal in this illustration in the nature of a 60 cycle alternating current, that is to say, the same frequency as that applied to the oscillator modulator diode 41 as a modulating frequency. As will be described hereinafter in connection with Figure III, the departure of the resonance curve peak of the measuring head from the modulation frequency sweep center of the oscillator provides a 60 cycle alternating current error signal. This signal in phase and form is sufficient to be identifiable as to its presence and direction, and provides suitable representation of the variable condition change and its direction.

The signal taken off the measuring head resonance circuit is applied to a transformer 82 and the output of the transformer 82 is applied through a rectifier 83 to a load resistor 84. Thus the transformer 82 is an impedance matching device with respect to the rectifier load resistor 84 for various values of the inductance 79 and the capacitance 80.

It is for the purpose of this impedance matching that the inductance-capacity arrangement of the resonance circuit in the measuring head is put in electrical series so that at resonance the voltage is at the minimum, as shown in the curve in Figure III. The output of the transformer 82 is rectified and applied to the parallel arrangement of the load resistor 84 and a condenser 85. This is a means of getting rid of radio frequency and developing an audio-frequency envelope. When there is an error signal, this envelope has the same frequency as that applied to the oscillator 10 in the initial modulating action, for example, 60 cycles. This error signal voltage is thus applied through an output lead 86 and through a radio frequency choke 87 to the transmission cable line 75. The choke 87 prevents incoming radio frequency from conflicting with outgoing audio-frequency error signal.

One of the substantial difficulties in prior art systems of this general nature has been a resistance factor of some liquids under measurement when their molecules are polar. When a measurement condenser is utilized with alternating current in the measurement of such a polar dielectric, a resistive factor appears.

In a circuit such as the measuring head circuit 20, the result is an increase in signal accompanied by a substantial increase in direct current. Such a substantial increase in direct current can effectively mask out the error signal itself. However, in the device of this invention, as indicated in the Figure II showing of the measurement head circuit 20, such direct current is opposed by a direct current arrangement in reverse. This opposition is provided through the rectifier diode 88 and its associated parallel arrangement of resistor 89 and condenser 90. A voltage is thus established in opposition to such polar molecule increased voltage so as to cancel out this undesirable effect and allow the useful error signal to proceed undisturbed.

Such a lossy dielectric puts a substantial direct current voltage across the resistor 84 and the opposing arrangement described above blocks this effect by means of a reverse direct current bias across the resistor 84. Accordingly, the rectifier 83 can produce an audio-frequency error signal as desired.

The initial arrangement of the system of this illustration is that the measuring head 20 is established at a natural resonance frequency with consideration for a desired starting point for the variable condition of the dielectric between the plates of the measuring condenser 22. The oscillator 10 is then established as providing a modulation frequency sweep which is centered at the natural frequency of the measurement head 20. Thus the oscillator is frequency matched to the measurement head 20.

Thereafter when a change occurs in the variable condition, that is, a dielectric change between the plates of the condenser 22, the resonance condition of the measurement head 20 changes to establish a different natural resonance frequency therefor. This action creates a difference between the natural resonance frequency of the head 20 and the center of the frequency sweep being supplied by the oscillator 10. This difference, through rectification as by the member 83 and its associated circuitry, provides a 60 cycle error signal which is fed back through the cable 21 to the audio-frequency amplifier and phase detector 25. Thereafter representations of this error signal are applied to the recording instrument 30, and to the oscillator 10 to adjust the resonance condition of the oscillator to provide a new range for the frequency sweep which is centered at the new natural resonance frequency of the measurement head 20 as established by the variable condition change. That is, the oscillator modulation is bodily shifted to follow the frequency change of the measurement head.

Thus a device is provided with two resonance circuits, one an oscillator and one a measurement head, wherein the measurement head is varied in its resonance condition and the oscillator is made to follow in what may be termed a resonance matching action. This following action is representative of the variable condition change and is available as a basis of a working output from the device. The error signal magnitude is not of immediate concern to this device except that it be sufficient for reasonable operation. It is the direction or phase, and the presence of the error signal, and the amount of adjustment necessary to make the error signal disappear, which is the measure of the variable condition change.

The departure of the natural resonance frequency of the measuring head 20 to one side or the other of the oscillator supplied frequency sweep center of that moment is indicative of the direction of the change in the variable condition.

With respect to Figure II, in the measuring head 20 and in the resonant circuit arrangement therein, the variable condition change which is being measured may be applied either to a condenser as at 22, or to an inductance as at 79. Various means of inductance change (not shown) may be used. In the event that the inductance 79 is used as a sensing element, the condensers 81 and 22 may be combined.

In the matter of actuation of the oscillator 10, in adjustment of the frequency modulation sweep thereof in response to an error signal from the measuring head 20, the structure shown is a mechanical actuator as indicated by dotted line 27 from the output of the audio-frequency amplifier and phase detector 25. Other means (not shown) of transferring this information may be used as desired, for example, electrical or electronic means in conventional systems for varying the capacity or the inductance of the oscillator 10.

Figure II is a representation of the resonance curve of the measuring head 20. It provides illustrative associated cuve formations indicating the nature of the voltage variation output of the measuring head under conditions of frequency matching or departure from matching with respect to the frequency sweep center of the oscillator 10 as related to the natural resonance frequency of the measuring head 20.

Figure III presents a main curve 91 which represents the resonance curve of the measurement head 20 of Figures I and II wherein the vertical component of the curve is voltage and the horizontal component is frequency. The peak of the resonance curve 91 is at the minimum point of voltage on the basis that the resonance circuit in the measurament head is a series arrangement of inductance and capacity. Thus in reasonance it is in a condition of the greatest passage of current and of the lowest voltage drop. As the measurement head departs from resonance in either direction the voltage rises sharply as indicated by the curve 91. A vertical center line passing through the peak of the curve 91 and indicated as 92 represents the initial matching frequency, that is the natural resonance frequency at which the measurement head 20 is established for a particular starting point of dielectric condition and at which the oscillator frequency sweep is centered.

The oscillator frequency modulation sweep in the starting condition of this system is indicated in Figure III as a plus and minus frequency sweep A. This continuous, alternating current audio-frequency sweep covers a portion of the peak of the resonance curve 91 with the modulation frequency sweep centered at the peak of the resonance curve as indicated at A'. The voltage pattern of the signal obtained under this starting condition is, for a 60 cycle modulation, a 120 cycle signal as indicated at A''. This 120 cycle signal is developed by the non-linear characteristic of the diode 83 at the low voltages impressed upon it. This is merely the starting condition. However, a variable condition value change alters the resonance curve by shifting it to the right or to the left as viewed in Figure III, while the frequency sweep supplied by the oscillator 10 remains temporarily the same. Thus the energizing frequency to the measuring head 20 no longer uniformly sweeps through the peak of the measuring head resonance curve. This action is illustrated by the representation of the frequency sweep B which is no longer centered at the resonance peak frequency of the measurement head. The location of the modulation frequency sweep B indicates that the resonance curve 91 has been moved to the right as viewed in the drawing. This means that the modulation sweep is more on one side of the resonance curve than on the other as indicated at B', and the voltage action which results is indicated as to form at B'', and has a 60 cycle error signal component therein.

Similarly, a departure of the resonance curve 91 to the left as viewed in Figure II establishes the oscillator frequency sweep as at C and the modulator sweep is again offset with respect to the resonance peak as indicated at C', only this time to the right. The voltage signal resulting therefrom again has a 60 cycle component as indicated at C'' but in opposite phase with respect to B''. Thus the error signal is identifiable as to presence by the presence of the 60 cycle signal and as to phase by the difference in phase of the signals B'' and C''.

In furtherance of this consideration a movement of the resonance curve 91 even further to the right establishes the oscillator frequency sweep at D with the sweep being over the portion of the resonance curve indicated at D' and the voltage resulting being in the 60 cycle form indicated at D''. The opposite condition, that is, a movement of the resonance curve to the left a substantial amount places the modulation sweep as indicated at E, the resonance curve portion covered by that sweep is represented at E', and the resultant voltage signal form is illustrated at E'', again, a 60 cycle error signal opposite in phase to the signal D''.

In continuing to shift the resonance curve 91 to the right to illustrate the action on different portions of the curve, the modulation sweep is indicated at F, and the resultant voltage signal therefrom is indicated at F'. A further departure in the same direction is indicated by a modulation frequency sweep representation G on a different slope of the curve. The voltage representation over this frequency sweep is represented at G'.

When the frequency sweep of the oscillator is centered at the natural reesonance frequency of the measurement head the A condition is produced, and there is no error signal. Even a slight departure from resonance instantly produces a 60 cycle component which is identifiable as to presence or absence and as to phase. As the departure of the measurement head resonance condition from the starting point is greater, the error signal remains 60 cycle and increases in amplitude as indicated by curves D". E", and F'. However, as the terminal portions of the curves in the different slopes are reached the amplitude of the error signal decreases as indicated at G'.

The usual working area is close to the peak of the resonance curve so that departures of the resonance curve from the starting natural resonance frequency one way or the other are ordinarily not very great. A very small departure produces the 60 cycle error signal and the corrective action with respect to the oscillator 10 (Figures I and II) continues until this signal disappears, that is, until the oscillator frequency sweep is moved over to match the movement of the resonance curve of the measurement head as occasioned by the variable condition change.

The Figure IV temperature compensation circuit is an illustrative example of an arrangement which may be used in the combination of a system according to this invention as the temperature compensator 17, Figures I and II.

This particular compensation circuit, Figure IV, is useful in situations wherein different K (dielectric constant) factors of the measuring condenser 22 (Figures I, II, and IV) are encountered, and where this K factor is a substantial variant with dielectric temperature change at the condenser 22. In general, high K values require more compensation.

Such K changes with temperature look like changes in composition or other variable condition factors being measured. The system must therefore be adjusted on an individual basis to compensate for such K changes, and for different levels of K factor as encountered in different compositions or combinations of compositions.

The temperature compensation device of Figure IV provides means for automatically compensating for temperature variation K factor changes. This device is adjustable as to operating level, or curve zero, and as to curve slope. Thus the recording pen 31, Figures I and II, remains stationary over a predetermined variation of K factor variation as caused by temperature change at the measuring condenser 22. Adjustments of the Figure IV circuit produce a range change (not span), and a curve slope change in re the overall system and as related to the function of the particular K factor which is involved.

The circuit of Figure IV is shown in its relation to the circuit of Figures I and II by the insertion in Figure IV of an indication of the frequency modulator 14, the measuring head 20 and the measuring condenser 22. Further, the connection 19 of the compensator 17 (Figures I and II) to the modulator 14 is shown in Figure IV, as well as the temperature bulb 23 in association with the measuring condenser 22.

The action of the Figure IV circuit is to vary the direct current voltage as applied to the frequency modulator 14 to a greater or less extent, and in a direction, as occasioned by temperature changes at the measuring condenser 22. This is the same type of action as described re the temperature compensator 17 (Figures I and II). However the Figure IV circuit action involves a feedback action to the temperature compensator from the error signal itself as it is expressed in the output of the amplifier and phase detector unit 25, Figures I and II.

Accordingly, the circuit of Figure IV comprises an alternating current 60 cycle source unit 93, a rectifier section 94, a resistance bridge 95 of which the temperature sensing thermistor bulb 23 is a part, output connections 19 to the frequency modulator 14, and a mechanical movement input indicated by dotted line 27' whose starting point is the Figure III output translation device 26 in the output of the Figure III amplifier and phase detector unit 25.

The Figure IV A.C. source unit 93 utilizes a combination of a differential transformer 93a and a regular transformer 93b. The 93b transformer applies voltage through a secondary coil section 93c to the rectifier 94 and an associated filter arrangement of condensers 96, 97 and resistor 98.

The differential transformer 93a also applies voltage, through a pair of secondary coils 93d and 93e, to the rectifier 94. An electrically shorted ring member 93f is mounted on the differential transformer core and is movable therealong to vary the coupling in differential transformer fashion. The ring 93f is actuated by the movement indicated by the dotted line 27' as an error signal feed-back.

The output of the differential transformer 93a is adjustable by means of a variable resistor 99 to vary the curve slope of the system action to match that of a particular K factor re the measuring condenser 22. The output of the regular transformer 93b is adjustable by means of a variable resistor 100 to adjust the zero of the system action to relate this action to the K factor curve level.

The combined output of the different transformer portions of the source unit 93 is thus applied through the rectifier 94 and the filter arrangement, and is then applied to the resistance bridge 95. Thereafter, a departure from the null of the resistance bridge applies a direct current voltage change to the modulator 14.

This invention therefore provides a new and improved resonance relation electrical servosystem wherein a resonance circuit is provided as a measurement head and another resonance circuit is provided as an oscillator for driving the measurement head wherein the oscillator frequency condition is related to that of the measurement head as a starting point and thereafter made to automatically follow resonance condition changes in the measurement head.

As many embodiments may be made of the above invention and as changes may be made in the embodiments set forth, without departing from the scope of the invention, it is to be understood that all matter hereinbefore set forth or shown in the accompanying drawings is to be interpreted as illustrative only and not in a limiting sense.

I claim:

An electrical resonance circuit frequency matching servosystem comprising, in combination: an electrical capacity sensor device for responding to changes in a dielectric, a measurement head electrical resonance circuit including said sensor device and responsive thereto, whereby changes in said dielectric representatively result in proportional changes in the resonance condition of said measurement circuit and consequently provide said measurement circuit with proportionally different natural resonance frequencies according to said dielectric changes, a resonance circuit oscillator, coupling means for activating said measurement circuit from said oscillator, modulation means coupled to said oscillator for continuously frequency modulating said oscillator with said modulation normally centered with respect to the natural resonance frequency peak of said measuring head, means for producing an amplitude modulation component output from said head in response to changes in the relation of said frequency conditions due to changes in said dielectric, feedback means from said measuring head to said oscillator, means responsive to said measuring head output through said feedback means for automatically adjusting the modulation range of said oscillator in response to, and in a frequency matching action with respect to, changes in the natural resonance frequency of said measurement head as occasioned by changes in said dielectric, whereby said frequency matching action provides proportional representations of said dielectric changes and said frequency modulation is maintained in its centered relation with respect to the natural resonance frequency peak of said measurement head under said frequency changing conditions, and temperature compensation means comprising a temperature sensing element in the ambiency of said capacity sensor device, coupling means between said temperature compensating means and said modulation means for automatically adjusting the range of said oscillator modulation in response to signals from said temperature sensing element as a means of compensating for temperature caused K factor changes in said dielectric, and coupling means from said feedback to the power input to said temperature compensation means for varying the power input to said temperature compensation means as a factor in said range adjustment and in accordance with error signals in said servosystem which are representative of K factor changes of said dielectric due to temperature changes in said dielectric.

References Cited in the file of this patent

UNITED STATES PATENTS

| | | |
|---|---|---|
| 2,280,678 | Waymouth | Apr. 21, 1942 |
| 2,508,081 | Taylor et al. | May 16, 1950 |
| 2,611,021 | Pearls et al. | Sept. 16, 1952 |
| 2,623,206 | Hornfeck | Dec. 23, 1952 |
| 2,651,940 | Kline | Sept. 15, 1953 |
| 2,682,033 | Smullin | June 22, 1954 |
| 2,714,663 | Norton | Aug. 2, 1955 |
| 2,788,445 | Murray et al. | Apr. 9, 1957 |
| 2,849,613 | Dicke | Aug. 26, 1958 |